(12) United States Patent
Zhu

(10) Patent No.: US 10,904,210 B2
(45) Date of Patent: Jan. 26, 2021

(54) DYNAMIC BOOKMARKING OF WEB ADDRESSES ACCESSED VIA SHORT URL

(71) Applicant: Microsoft Technology Licensing, LLC, Redmond, WA (US)

(72) Inventor: Zhengwen Zhu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/198,165

(22) Filed: Nov. 21, 2018

(65) Prior Publication Data
US 2020/0162423 A1 May 21, 2020

(51) Int. Cl.
*H04L 29/12* (2006.01)
*H04L 29/08* (2006.01)
*G06F 3/0482* (2013.01)
*G06F 3/0484* (2013.01)

(52) U.S. Cl.
CPC ...... *H04L 61/2596* (2013.01); *H04L 61/1594* (2013.01); *H04L 61/6072* (2013.01); *H04L 67/02* (2013.01); *G06F 3/0482* (2013.01); *G06F 3/0484* (2013.01)

(58) Field of Classification Search
CPC ............ H04L 61/2596; H04L 61/6072; H04L 61/1594; H04L 67/02; G06F 3/0482; G06F 3/0484
USPC ........................................................ 709/245
See application file for complete search history.

(56) References Cited

U.S. PATENT DOCUMENTS

| | | | |
|---|---|---|---|
| 6,037,934 A | 3/2000 | Himmel et al. | |
| 6,041,360 A | 3/2000 | Himmel et al. | |
| 6,100,890 A | 8/2000 | Bates et al. | |
| 6,535,912 B1 | 3/2003 | Anupam et al. | |
| 7,062,561 B1 * | 6/2006 | Reisman ................. | G06F 16/00 709/227 |
| 7,962,450 B2 | 6/2011 | Kruis et al. | |
| 9,990,341 B2 | 6/2018 | DeLuca et al. | |

(Continued)

OTHER PUBLICATIONS

Wiki, Mozilla, "Browser History: Redirects", Retrieved from: https://web.archive.org/web/20060430044755/https:/wiki.mozilla.org/Browser_history:Redirects, Apr. 30, 2006, 11 pages.

(Continued)

*Primary Examiner* — Chris Parry
*Assistant Examiner* — Weiwei Y Stiltner
(74) *Attorney, Agent, or Firm* — Michael Best & Friedrich LLP

(57) ABSTRACT

A method for dynamically generating a bookmark suggestion within a user interface of a computing device. The method includes accessing a target URL, receiving a request to bookmark the target URL, and determining if the target URL was accessed via a URL redirection function. The method also includes generating a prompt for display on the user interface. The prompt includes a user selectable option to save one of the target URL or a redirection URL associated with the target URL as a desired bookmark target address, based on the target URL being determined to have been accessed via the URL redirection function. The method further includes receiving an indication via the user interface of the desired bookmark target address, and saving the target URL or the redirection URL as the desired bookmark target address based on the received indication.

20 Claims, 4 Drawing Sheets

(56) References Cited

U.S. PATENT DOCUMENTS

| | | |
|---|---|---|
| 2002/0116411 A1 | 8/2002 | Peters et al. |
| 2002/0116525 A1 | 8/2002 | Peters et al. |
| 2004/0075682 A1 | 4/2004 | Burleson |
| 2004/0107296 A1* | 6/2004 | Donker ............... G06F 16/9574 709/245 |
| 2012/0023390 A1* | 1/2012 | Howes .................. G06F 16/951 715/205 |
| 2013/0311497 A1 | 11/2013 | Jang |
| 2014/0280883 A1 | 9/2014 | Pieczul et al. |
| 2015/0269129 A1 | 9/2015 | Dou |
| 2016/0248837 A1* | 8/2016 | Cai ........................ H04L 67/02 |
| 2016/0330252 A1* | 11/2016 | Stahl .................... H04L 65/608 |
| 2017/0052994 A1* | 2/2017 | Jain ..................... G06F 16/9562 |
| 2017/0324837 A1 | 11/2017 | Quintero |

OTHER PUBLICATIONS

"International Search Report Issued in PCT Application No. PCT/US19/061342", dated Feb. 12, 2020, 10 pages.

\* cited by examiner

DYNAMIC BOOKMARKING OF WEB ADDRESSES ACCESSED VIA SHORT URL

SUMMARY

Web addresses have become longer and more complex over time, making it challenging for a user to manually enter a web address into a web browser. Accordingly, many systems utilize short uniform resource locators (URLs) to allow for shorter web addresses to be used to reach a desired web address. Multiple tools and systems currently exist to help users to create short URLs to allow for easier sharing of web addresses, as well as for tracking purposes. Generally, a user may input a short URL into a web browser, or other web access system, which is then used by the web browser to contact an intermediate server, which then provides a redirection to the desired web address. A user may then bookmark the desired web address to allow for quick access at another time. The web browser will generally use the destination URL and not the short URL when bookmarking the location.

However, new URL categories have started to be used where the destination URL is not a permanent or static URL, but instead changes as content associated with the destination URL changes. Examples include online documents or statistical reports, which can be moved to new locations or URLs when the associated data is updated or changed. Accordingly, a user may be directed to out of date information when accessing the desired web address via the previously saved bookmark, where the bookmark uses the destination URL. Thus, a system and method for dynamically generating user prompts to ensure that a user will be able to access the most up-to-date data using the saved bookmark are described herein.

For example, one embodiment provides a method for dynamically generating a bookmark suggestion within a user interface of a computing device. The method includes accessing, via the computing device, a target URL. The method further includes receiving, via the computing device, a request to bookmark the target URL, and determining, via the computing device, if the target URL was accessed via a URL redirection function. The method also includes generating, via the computing device, a prompt for display on the user interface. The prompt includes a user selectable option to save one of the target URL or a redirection URL associated with the target URL as a desired bookmark target address, based on the target URL being determined to have been accessed via the URL redirection function. The method further includes receiving, via the computing device, an indication via the user interface of the desired bookmark target address, and saving, via the computing device, the target URL or the redirection URL as the desired bookmark target address based on the received indication.

A further embodiment provides a system for providing dynamically generated bookmark suggestions. The system includes a user interface, a memory for storing executable program code, and one or more electronic processors. The electronic processors are functionally coupled to the memory and the user interface. The electronic processors are configured to access a target Uniform Resource Locator (URL), receive a request to bookmark the target URL via the user interface, and determine if the target URL was accessed via a URL redirection function. The processors are further configured to generate a prompt for display on the user interface, wherein the prompt comprises a user selectable option to save one of the target URL or a redirection URL associated with the target URL as a desired bookmark target address, based on the target URL being determined to have been accessed via the URL redirection function. The processors are also configured to receive an indication via the graphical user interface of the desired bookmark target address, and save the one of the target URL or the redirection URL as the desired bookmark target address based on the received indication.

A further embodiment provides a method for dynamically providing Uniform Resource Locator (URL) navigation suggestions within a graphical user interface of a computing device. The method includes receiving, via the computing device, a request to access a target URL, and determining, via the computing device, if the target URL was previously accessed via a URL redirection function. The method further includes receiving, via the computing device, an indication that the redirection URL is associated with a new target URL, wherein the new target URL is different from the target URL. The method also includes generating, via the computing device, a prompt for display on the graphical user interface and that includes a user selectable option to access the target URL of the new target URL, based on the redirection URL being associated with the new target URL.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Short universal resource locators ("URLs") are used to shorten a standard URL ("long URL"), while still directing a user to the desired website. Short URLs allow for easier sharing and tracking for users, due to their compact size and easy to enter format. Generally, a user may enter a short URL into an address bar of a web browser (for example, Microsoft Edge). The browser may then identify a short URL provider associated with the entered short URL, and contact an intermediate server associated with the short URL provider. The intermediate server then redirects the browser to the desired final destination website. For example, redirection may be performed via an HTTP redirection command. Example HTTP redirection commands can include HTTP 301 or HTTP 302 commands.

Figure 1:
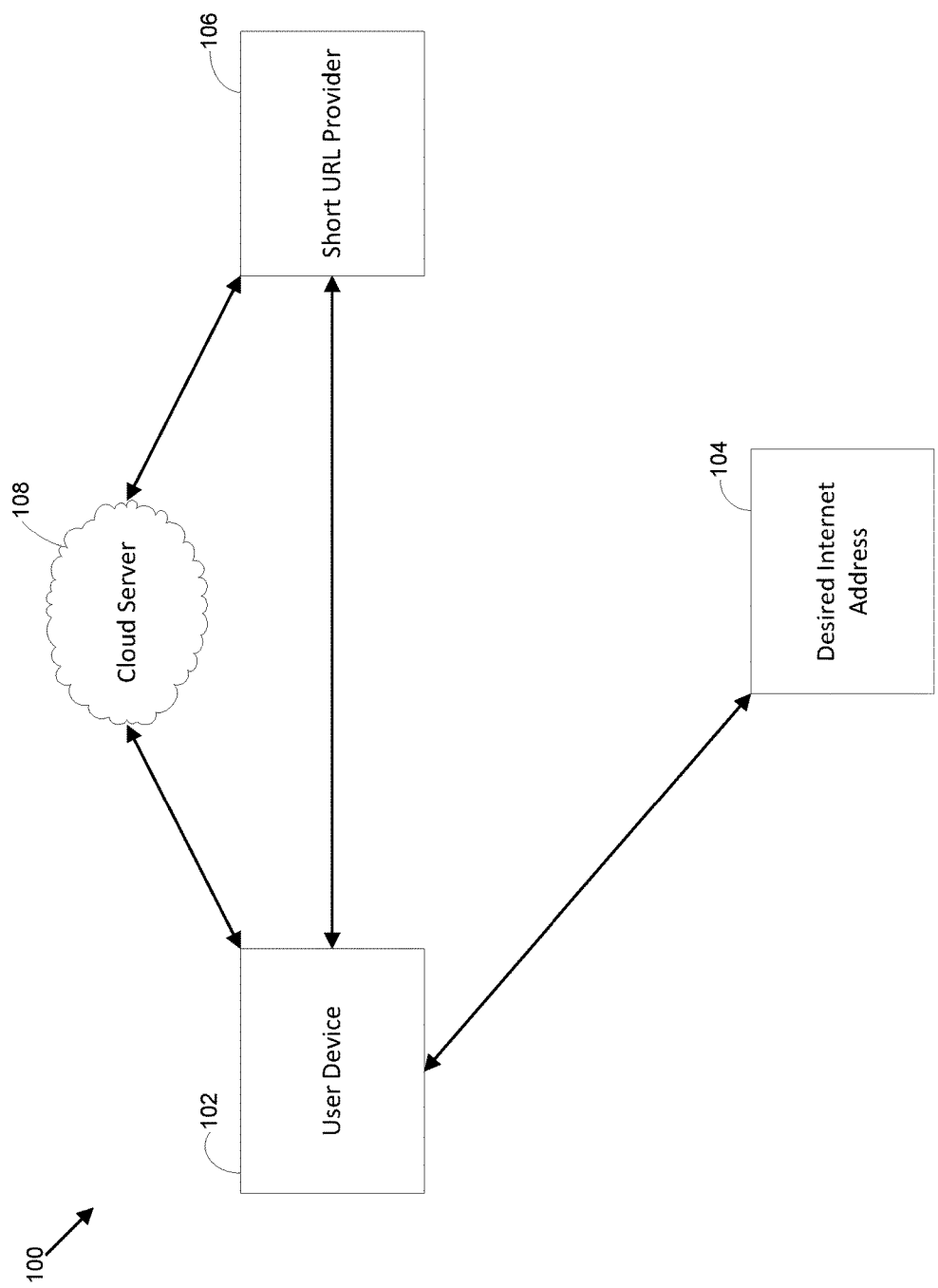
FIG. 1 is a block diagram of a system for accessing a desired web-address, according to some embodiments.

Turning to FIG. 1, an example system 100 for utilizing short URLs is shown. In the example illustrated, the system 100 includes a user device 102, a desired web address 104, a short URL provider 106, and a cloud based server 108. In one embodiment, the user device 102 is an Internet-connected device, such as a personal computer, a smartphone, a tablet computer, a laptop computer, a virtual desktop terminal, or other network-enabled device. In other examples, the user device 102 may be a device capable of communicating with one or more other servers or devices to access data or perform other functions. The user device 102 will be described in more detail below.

The desired web address 104 may be a web address desired to be accessed by a user of the user device 102. The desired web address 104 is associated with a long URL. The desired web address 104 may be stored on one or more servers (local, remote, cloud, etc.). The desired web address 104 may access a web site, data files (documents, spreadsheets, etc.), shared workspaces (statistical data, collaborative work files, etc.), multi-media files, etc.

The short URL provider 106 is a service provider that can generate a short URL based on a long URL. Generally, the short URL provider 106 associates a long URL with a unique key. Often the unique key is appended to the short URL after the top-level domain name. The unique key may be generated in base 36, base 62 (using upper and lower case letters), and may utilize hash functions or random number generators to ensure that the key sequences are not predictable. However, other short URL generation schemes are contemplated. An example of shortening a URL is shown below. A first URL, for example, http://example.com/product?ref=8346748&type=radio can be shortened to a second URL, for example, http://tinyurl.com/exampleradio. When a user accesses a short URL associated with the short URL provider 106, the short URL provider 106 may redirect a web browser of the user device 102 to the long URL associated with the short URL. In one example, the short URL provider 106 redirects the web browser via an HTTP 301 (permanent redirect), 302, or 307 (temporary redirect).

The short URL provider 106 may be associated with one or more short URL service providers. Short URL service providers may include: Bitty; TinyURL; Tiny.cc; LiveChat URL shortener; is.gd; soo.gd; s2r.com; clicky.me; budurl.com; bc.vc; googl.gl; aka.ms; t.co; and any other short URL provider.

The cloud based server 108 may provide communication between the short URL provider 106 and the user device 102. In some embodiments, the cloud based server 108 may provide one or more functions to a web browser of the user device 102, as will be described in more detail below.

Figure 2:
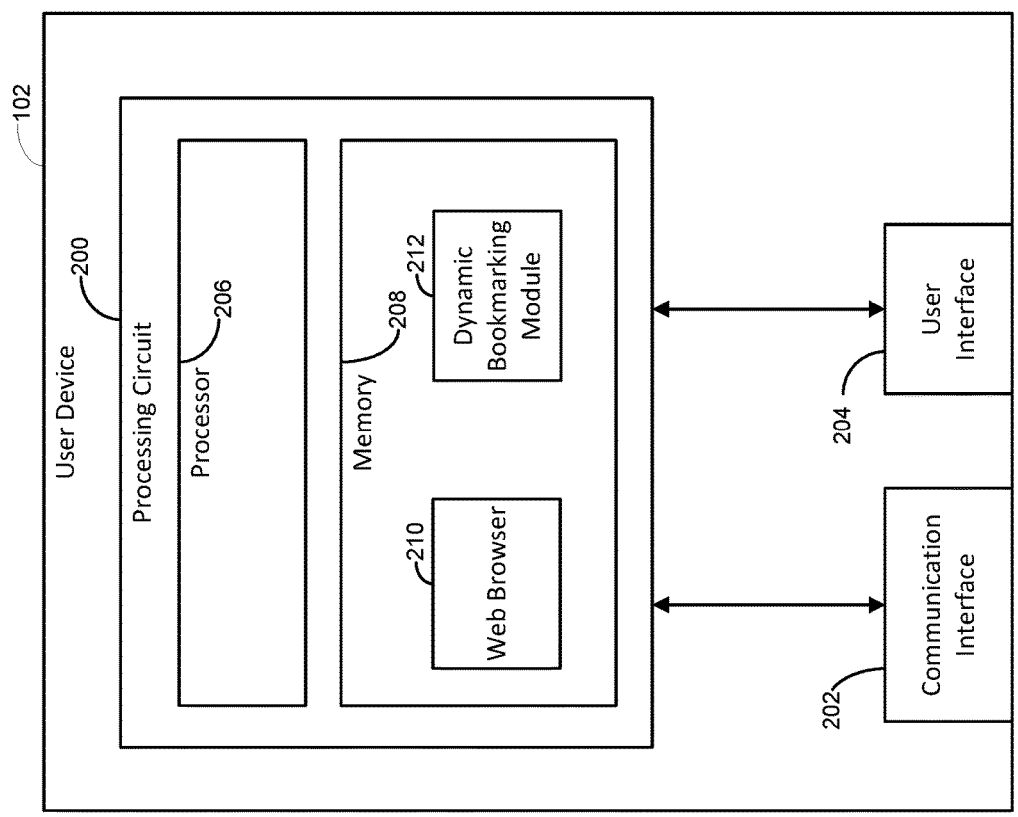
FIG. 2 is a block diagram of a user device, according to some embodiments.

Turning now to FIG. 2, a block diagram of an example user device, such as user device 102 is shown, according to some embodiments. As described above, the user device 102 may be a personal computer, a laptop computer, a tablet computer, a mobile device such as a smartphone, a dedicated purpose computing device, etc. As shown in FIG. 2, the user device 102 includes a processing circuit 200, a communication interface 202, and a user interface 204. The processing circuit 200 includes an electronic processor 206 and a memory 208. The processing circuit 200 may be communicably connected to one or more of the communication interface 202 and the user interface 204. The electronic processor 206 may be implemented as a programmed microprocessor, an application specific integrated circuit (ASIC), one or more field programmable gate arrays (FPGA), a group of processing components, or with other suitable electronic processing components.

The memory 208 (for example, a non-transitory, computer-readable medium) includes one or more devices (for example, RAM, ROM, Flash memory, hard disk storage, etc.) for storing data and/or computer code for completing or facilitating the various processes, layers, and modules described herein. The memory 208 may include database components, object code components, script components, or other types of code and information for supporting the various activities and information structure described in the present application. According to one example, the memory 214 is communicably connected to the electronic processor 206 via the processing circuit 200 and may include computer code for executing (for example, by the processing circuit 200 and/or the electronic processor 206) one or more processes described herein.

The communication interface 202 is configured to facilitate communication between the user device 102 and one or more external devices or systems, such as those shown in FIG. 1. The communication interface 202 may be or include wireless communication interfaces (for example, antennas, transmitters, receivers, transceivers, etc.) for conducting data communications between the user device 102 and one or more external devices, such as the cloud based server 108, the short URL provider 106 and/or the desired web address 104. In some embodiments, the communications interface 204 utilizes one or more wireless communication protocols, such as cellular (3G, 4G, 5G, LTE, CDMA, etc.), Wi-Fi, Wi-MAX, ZigBee, ZigBee Pro, Bluetooth, Bluetooth Low Energy (BLE), RF, LoRa, LoRaWAN, Near Field Communication (NFC), Z-wave, 6LoWPAN, Thread, WiFi-ah, and/or other wireless communication protocols. The communication interface 202 may additionally be or include wired communication interfaces to facilitate wired communication between the user device 102 and one or more other devices, such as those described in FIG. 1. The wired communication interfaces may be or include jacks, wire terminals, ports, etc. for conducting data communications between the user device 102 and one or more external devices. The communication interface 202 may include wired interfaces such as Universal Serial Bus (USB) interfaces, USB-C interfaces, Firewire interfaces, CAT5 interfaces, universal asynchronous receiver/transmitter (UART) interfaces, serial (RS-232, RS-485), fiber optic interface, etc.

The user interface 204 may allow for a user to provide inputs to the user device 102. For example, the user interface 204 may include a keyboard, a mouse, a trackpad, a touchscreen (for example, resistive, capacitive, inductive, etc.), or other known input mechanism. The user interface 204 may further provide a display to allow a user to view various data provided by the user device 102. The user interface 204 may further be configured to provide a display of a graphical user interface ("GUI"), which may be used by a user to provide inputs to the user interface 204, as well as display certain data to the user.

As described above, the memory 208 may be configured to store various processes, layers, and modules, which may be executed by the electronic processor 206 and/or the processing circuit 200. In one embodiment, the memory 208 may include a web browser 210. In one embodiment, the web browser 210 is the web browser Microsoft Edge. Other web browsers, such as Google Chrome, Firefox, Safari, etc., may also be used. The web browser 210 allows a user to view websites, such as HTML based webpages. In some embodiments, the web browser 210 may support multiple types of HTML such as ZHTML and HTML 5, as well as dynamic JavaScript, and encryption used by secure web sites. The web browser 210 may be configured to process HTML (or other encoding types), which may include text, links to other web addresses, and references to images and other items. The web browser 210 may be configured to process the data and then render the data in a browser window, which may be viewable via the user interface 204. In one embodiment, the web browser 210 includes a GUI, which can be interfaced with by a user via the user interface 204.

The memory 208 may further include a dynamic bookmarking module 212. In some embodiments, the dynamic bookmarking module 212 is integrated into the web browser 210. In other embodiments, the dynamic bookmarking module 212 may be a plug in or extension which is accessed by the web browser 210. The dynamic bookmarking module 212 is configured to perform one or more functions to provide a user with an option on whether to bookmark a short URL or a long URL based on various properties, which will be discussed in more detail below. Bookmarking, as used herein, is the storage of a URL for later retrieval by a user. In some embodiments, the dynamic bookmarking module 212 may be in communication with a cloud based server, such as cloud based server 108 (described above). The cloud based server 108 may allow for the dynamic bookmarking functions to be performed in the cloud based server 108 to reduce the processing and memory load on the user device 102. In some examples, the cloud based server 108 may communicate with the user device 102 (and the processing circuit 200) via the communication interface 202.

Figure 3:
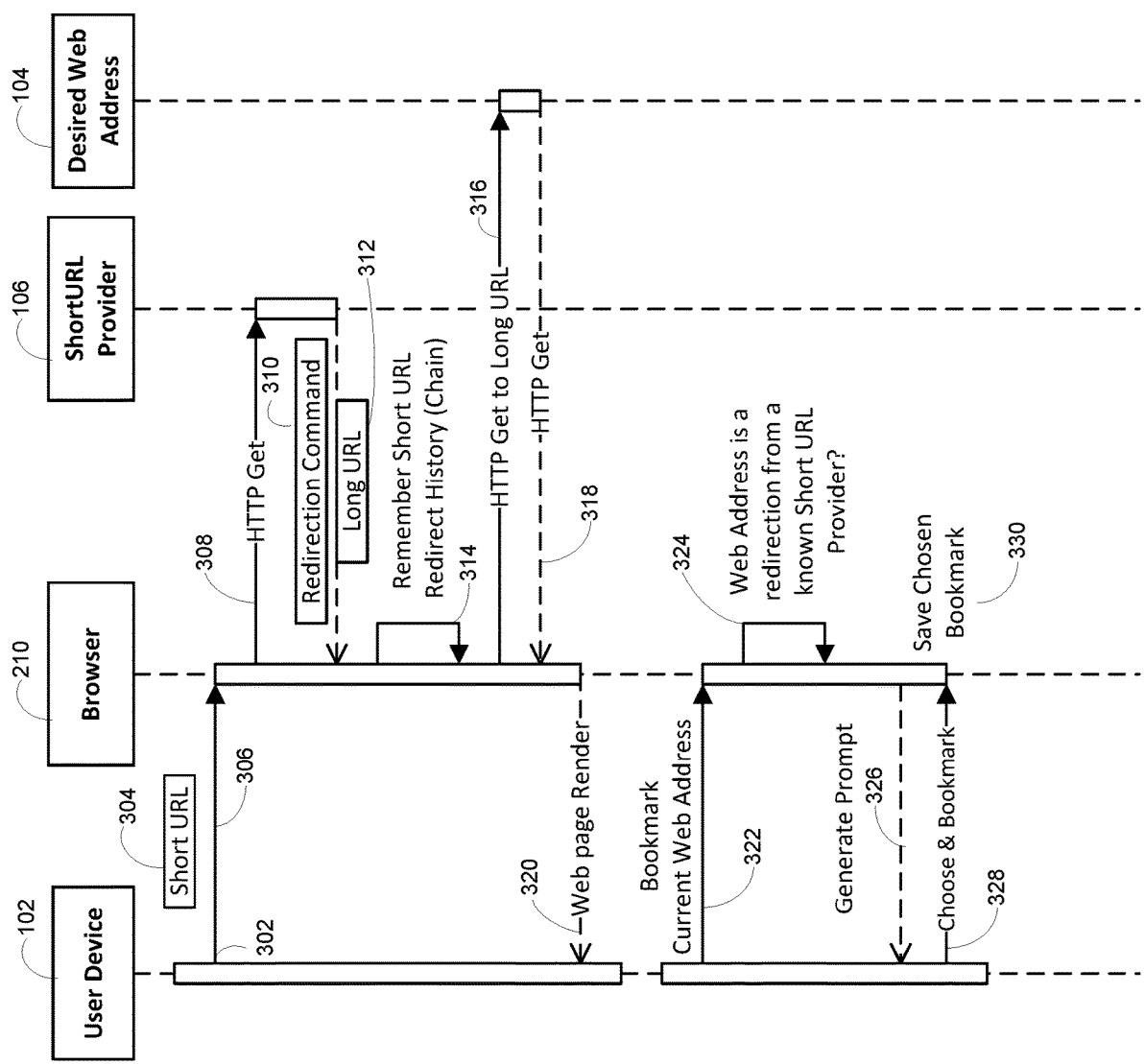
FIG. 3 is a process diagram illustrating a first process for dynamically saving a bookmark to a desired web address, according to some embodiments.

Turning now to FIG. 3, a process diagram illustrating an example process 300 for performing dynamic bookmarking is shown. While aspects of the process 300 are described with reference to components shown in FIGS. 1 and 2, it is contemplated that other devices may be used to perform the process 300. In additional, the process 300 is described with respect to steps or acts, but it should be understood the process describes an overall logic and message flow. At step 302, the user device 102 receives an input requesting access to a web address, such as the desired web address 104, associated with a short URL 304. For example, a user may input the short URL 304 via the user interface 204. In other examples, a user may select a link associated with the short URL 304 on the display of the user interface 204.

In the example shown, the request is sent to the web browser 210 at step 306. The web browser 210, upon receiving the request, can generate an HTTP Get command and transmit the command to a short URL provider 106 at 308. While the process 300 describes the web browser 210 generating and transmitting an HTTP Get request, it is contemplated that other functions may be used to retrieve the desired information from the short URL provider 106. In one embodiment, the web browser 210 is configured to determine a short URL provider 106 associated with the short URL 304. In one example, the web browser may determine the short URL provider 106 associated with the short URL 304 based on one or more encoded properties of the short URL 304. For example, the short URL 304 may have a top-level domain name (for example, http://tinyurl.com, which provides a pointer to the short URL provider 106 (here, tinyurl.com) associated with the short URL 304.

The short URL provider 106, upon receiving the HTTP Get request associated with the short URL 304, transmits a redirection command 310, providing a redirection to a long URL 312 associated with the desired web address 104. In one embodiment, the redirection command 310 is an HTTP 302 redirection command. In other examples, other redirection commands 310 may be an HTTP 301 or 307 redirect command. The long URL 312 and redirection command 310 are received by the web browser 210. The web browser 210 then stores the short URL redirect history at 314. In some embodiments, the web browser 210 stores the redirect history as a chain of events. The web browser 210 may store the short URL redirect history in the memory 208 of the user device 102. In other embodiments, the web browser 210 may provide the short URL redirect history to dynamic bookmarking module 212 and/or the cloud based server 108.

Upon receiving the redirection command 310 and long URL 312, the web browser 210 transmits a Get request (such as an HTTP Get request) to the desired web address 104 (or a server associated therewith) at 316 using the long URL 312. The desired web address 104 then responds with a Get request response at 318. Upon receiving the Get request response, the web browser 210 renders the web page at 320 on user device 102.

The user device 102 provides a request to bookmark the desired web address 104 at 322. In one example, the request is received at the user device 102 via the user interface 204. The web browser 210 determines if the desired web address 104 was previously accessed via a redirection request at 324. In some embodiments, the web browser 210 determines if a redirection command was stored in the redirection history for the given desired web address 104 (and the associated long URL 312). The web browser 210 may further determine if the redirection was received via a known short URL provider. If the web browser 210 determines that the desired web address 104 was previously accessed via a redirection and/or received via a known short URL provider, the web browser 210 generates a prompt at 326 asking a user to select whether to save either the long URL 312 associated with the desired web address 104 or the short URL 304 initially used to access the desired web address 104 as the bookmark address. The user may then choose which address to bookmark at 328 and the web browser 210 then saves the selected address as the bookmark at 330. As described above, this can allow the user to always access the short URL 304 (if user selects to bookmark that address) when using the bookmark to navigate to the desired web address 104. This is advantageous where the long URL associated with the desired web address 104 may change over time (such as when data is updated on the desired web address 104). The short URL 304 may be updated by an owner of the desired web address 104 (or other users providing data or modifications to the desired web address 104), thereby allowing the user to always access the desired web address 104 via the short URL 304, where the short URL 304 has been bookmarked.

Figure 4:
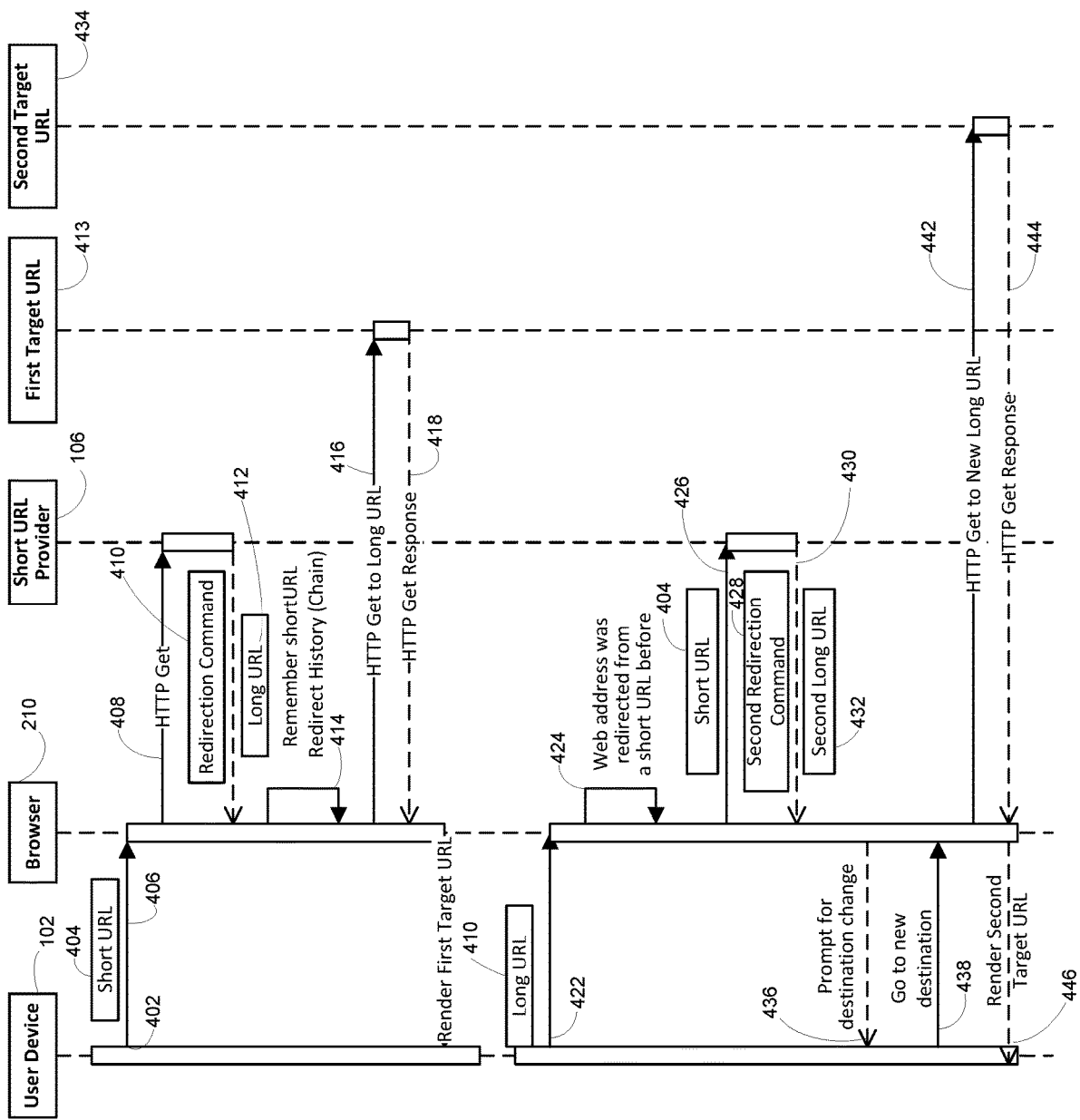
FIG. 4 is a process diagram illustrating a process for dynamically prompting a user to select a desired web address, according to some embodiments.

Turning now to FIG. 4, a process diagram illustrating an example process 400 for providing dynamic redirection within a web browser is shown. While aspects of the process 400 are described with reference to components shown above in FIGS. 1 and 2, it is contemplated that other devices may be used to perform the process 400. In the example shown, the user device 102 receives, at step 402, an input requesting access to a web address, such as the desired web address 104, associated with short URL 404. For example, a user may input the short URL 404 via the user interface 204. In other examples, a user may select a link associated with the short URL 404 on the display of the user interface 204. The request is sent to the web browser 210 at step 406. The web browser 210, upon receiving the request, can generate an HTTP Get command and transmit the command to a short URL provider 106 at step 408. While the process 400 describes the web-browser generating and transmitting an HTTP Get request, it is contemplated that other functions may be used to retrieve the desired information from the short URL provider 106. In one embodiment, the web browser 210 is configured to determine a short URL provider 106 associated with the short URL 404. In one example, the short URL provider is determined based on one or more encoded properties of the short URL 404. For example, the short URL 404 may have a top-level domain name (for example, http://tunyurl.com), which provides a pointer to the short URL provider 106 (here, tinyurl.com) associated with the short URL 404.

The short URL provider 106, upon receiving the HTTP Get request associated with the short URL 404, transmits a redirection command 410, providing a redirection to a long URL 412 associated with a first target web address 413. In one embodiment, the redirection command 410 is an HTTP 302 redirection command. In other examples, other redirection commands may be HTTP 301 or 307 redirect commands. The long URL 412 and redirection command 410 are received by the web browser 210. The web browser 210 then stores the short URL redirect history at step 414. In some embodiments, the web browser stores the redirect history as a chain of events. The URL redirect history may include a record of a redirection command (for example HTTP 302 command), an identity of the short URL provider 106, and/or other parameters. The web browser 210 may store the short URL redirect history in the memory 208 of the user device 102. In other embodiments, the web browser 210 may provide the short URL redirect history to dynamic bookmarking module 212 and/or the cloud based server 108.

Upon receiving the redirection command 410 and the long URL 412, the web browser 210 transmits a Get request (such as an HTTP Get request) to the first target web address 413 at step 416 using the long URL 412. The desired web address 104 then responds with a Get request response at step 418. Upon receiving the Get request response, the web browser 210 renders the web page at 420 on user device 102.

The user device 102 may then receive another request from a user to access the first target web address 413, and directing the browser to the long URL 412 at 422. The web browser 210 may then determine that the long URL 412 was previously accessed via a redirection at 424. For example, the web browser 210 may determine that the long URL 412 was previously accessed via a redirection based on the stored redirection history, such as that stored at 414, above. If the browser determines that the long URL 412 was not previously accessed via a redirection (for example, the user originally entered a long URL associated with the first target web address 413), the web browser 210 may issues an HTTP Get request, and render the first target web address, as described above.

If the web browser 210 does determine that the web address was directed from a short URL before, at 424, the web browser 210 may issues a silent HTTP get command to the short URL provider 106 at 426. In one example, the silent HTTP Get command is directed to the short URL provider 106 based on the short URL 404 previously used to access the first target web address 413 associated with the long URL 412. The short URL provider 106, upon receiving the HTTP Get command may determine if the short URL 404 is now associated with a new long URL, and thereby to a different target web address. If the short URL 404 is determined to be associated with a different address, a second HTTP redirection command 428 (for example an HTTP 302 redirection) is transmitted to the web browser 210 by the short URL provider 106 at 430. The second HTTP redirection command 428 may be associated with a second long URL 432 associated with a second target web address 434.

Upon receiving the second HTTP redirection command 428, the web browser 210 may present a prompt on the user device 102 allowing a user to select to access either the first target web address 413 or the second target web address 434 at 436. The user may select the second target URL web address 434 at 438 using the user device 102. The web browser 210 then transmits an HTTP Get command to the second target web address 434 at 440 and receives an HTTP Get Response from the second target web address 434 at 444. The web browser 210 may then render the second target web address 434 at 446 on the user device 102. Conversely, if the user chooses to access the first target web address 413, the web browser 210 may access the first target web address 413 as described above in 416, 418 and 420.

In some examples, the web browser 210 may be evaluate other data prior to providing the prompt to the user device 102 allowing the user to select to access either first target web address 413 or the second target web address 434. For example, some short URL providers may only allow for a short URL to be used once, where other short URL providers may allow for multiple uses of the same short URL address. If the web browser 210 determines that the short URL (such as short URL 404) is likely to be a one-time use only short URL (for example where the short URL provider only allows for one time access), the web browser 210 may not provide the prompt at 436. Conversely, if the web browser 210 determines that the short URL (such as short URL 404) is likely a multi-use short URL (for example where the short URL provider allows for multiple uses), the web browser 210 may proceed with providing the prompt at 436.

In other examples, the web browser 210 may be configurable to allow for a user or administrator to set parameters relating to short URLs. In one embodiment, these parameters are used by the web browser 210 (or dynamic bookmarking module 212) to determine when a prompt is to be presented to a user, such as to either save a short URL as a bookmark, or to provide a user with options to navigate to a long URL or an associated short URL. For example, the web browser 210 may be configured to only provide the above prompts where the short URL is associated with specific or approved short URL providers. This can allow for administrators to configure web browsers to adhere to company policies or rules regarding access to external sites via short URLs.

The functional block diagrams, operational scenarios and sequences, and flow diagrams provided in the figures are representative of exemplary systems, environments, and methodologies for performing novel aspects of the disclosure. While, for purposes simplicity of explanation, methods included herein may be in the form of a functional diagram, operational scenario or sequence, or flow diagram and may be described as a series of acts, it is to be understood and appreciated that the methods are not limited by the order of acts, as some acts may, in accordance therewith, occur in a different order or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above.

The invention claimed is:

1. A method for dynamically generating a bookmark suggestion within a user interface of a computing device; the method comprising:
   accessing, via the computing device, a target Universal Resource Locator (URL);
   receiving, via the computing device, a request to bookmark the target URL;
   determining, via the computing device, if the target URL was accessed via a URL redirection function in response to receiving the request to bookmark the target URL;
   generating, via the computing device, a prompt for display on the user interface and wherein the prompt comprises a user selectable option to save one of the target URL or a redirection URL associated with the target URL as a desired bookmark target address, based on the target URL being determined to have been accessed via the URL redirection function;
   receiving, via the computing device, an indication via the user interface of the desired bookmark target address; and
   saving, via the computing device, the target URL or the redirection URL as the desired bookmark target address based on the received indication.

2. The method of claim 1, wherein the redirection function is one of an HTTP 301 redirection function or an HTTP 302 redirection function.

3. The method of claim 1, further comprising:
   determining, via the computing device, if the redirection URL is associated with a short URL provider; and
   wherein the generating of the prompt for display on the user interface is based on the target URL being determined to have been accessed via the URL redirection function and the redirection URL being determined to be associated with a short URL provider.

4. The method of claim 3, wherein the computing device determines if the redirection URL is associated with a short URL provider based on a top level domain name of the short URL.

5. The method of claim 1, wherein the redirection URL is a short URL.

6. The method of claim 1, wherein the target URL is a long URL.

7. The method of claim 1, further comprising:
   receiving, at the computing device, a request to access the target URL;
   determining, at the computing device, if the target URL was previously accessed via the URL redirection function; and
   receiving an indication, at the computing device, that the redirection URL is associated with a new target URL.

8. The method of claim 7, further comprising:
   generating, via the computing device, a second prompt for display on the user interface and that includes a user selectable option to access the target URL or the new target URL, based on the redirection URL being associated with the new target URL.

9. A system for providing dynamically generated bookmark suggestions, the system comprising:
   a user interface;
   a memory for storing executable program code; and
   one or more electronic processors, functionally coupled to the memory and the user interface, the one or more electronic processors configured to:
   access a target Uniform Resource Locator (URL);
   receive a request to bookmark the target URL via the user interface;
   determine if the target URL was accessed via a URL redirection function in response to receiving the request to bookmark the target URL;
   generate a prompt for display on the user interface, wherein the prompt comprises a user selectable option to save one of the target URL or a redirection URL associated with the target URL as a desired bookmark target address, based on the target URL being determined to have been accessed via the URL redirection function;
   receive an indication via the graphical user interface of the desired bookmark target address; and
   save the one of the target URL or the redirection URL as the desired bookmark target address based on the received indication.

10. The system of claim 9, wherein the one or more electronic processors are further configured to determine if the redirection URL is associated with a short URL provider, wherein the generation of the prompt for display on the graphical user interface is based on the target URL being determined to have been accessed via the URL redirection function and the redirection URL being determined to be associated with a short URL provider.

11. The system of claim 9, wherein the one or more electronic processors are further configured to determine if the redirection URL is associated with a short URL provider based on a top level domain name of the short URL.

12. The system of claim 9, wherein the redirection URL is a short URL.

13. The system of claim 9, wherein the target URL is a long URL.

14. The system of claim 9, wherein the one or more electronic processors are further configured to:
   receive a request to access the target URL;
   determine if the target URL was previously accessed via the URL redirection function; and
   receive an indication that the redirection URL is associated with a new target URL.

15. The system of claim 14, wherein the one or more electronic processors are further configured to generate a second prompt for display on the user interface and that includes a user selectable option to access the target URL or the new target URL, based on the redirection URL being associated with the new target URL.

16. A method for dynamically providing Uniform Resource Locator (URL) navigation suggestions within a graphical user interface of a computing device, the method comprising:
   receiving, via the computing device, a request to access a target URL;
   determining, via the computing device, if the target URL was previously accessed via a URL redirection function in response to receiving the request to access the target URL;
   receiving, via the computing device, an indication that the redirection URL is associated with a new target URL, wherein the new target URL is different from the target URL; and
   generating, via the computing device, a prompt for display on the graphical user interface and that includes a user selectable option to access one of the target URL and the new target URL, based on the redirection URL being associated with the new target URL.

17. The method of claim 16, wherein the redirection URL is a short URL.

18. The method of claim 16, wherein the redirection URL is associated with a short URL provider.

19. The method of claim 18, wherein the indication that the redirection URL is associated with a new target URL is received from the short URL provider.

20. The method of claim 18, wherein the computing device determines if the redirection URL is associated with a short URL provider based on a top level domain name of the short URL.

* * * * *